No. 866,071. PATENTED SEPT. 17, 1907.
F. RUNGE.
BEER COOLER.
APPLICATION FILED JAN. 22, 1906.
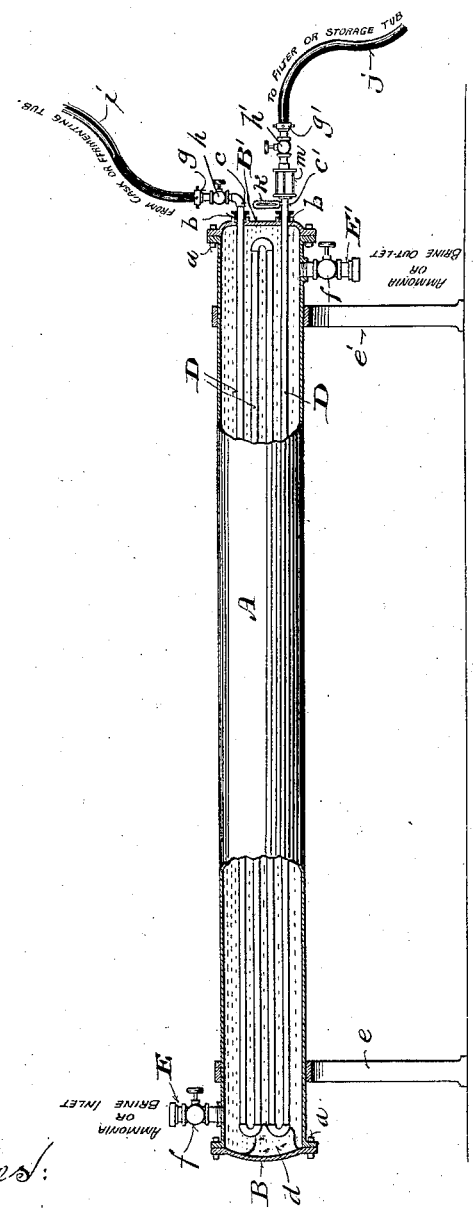

UNITED STATES PATENT OFFICE.

FRANZ RUNGE, OF SHEBOYGAN, WISCONSIN, ASSIGNOR OF ONE-THIRD TO HERMAN SCHREIER AND ONE-THIRD TO ALFRED P. STEFFEN, OF SHEBOYGAN, WISCONSIN.

BEER-COOLER.

No. 866,071.     Specification of Letters Patent.     Patented Sept. 17, 1907.

Application filed January 22, 1906. Serial No. 297,182.

*To all whom it may concern:*

Be it known that I, FRANZ RUNGE, a citizen of the United States, and a resident of Sheboygan, in the county of Sheboygan and State of Wisconsin, have invented certain new and useful Improvements in Beer-Coolers; and I do hereby declare that the following is a full, clear, and exact description thereof.

The object of my invention is to provide a simple, effective and economical beer cooling apparatus, the parts of which are so arranged as to be quickly and readily cleansed when necessary, said invention consisting in certain peculiarities of construction and combination of parts as hereinafter fully set forth with reference to the accompanying drawings and subsequently claimed.

The drawing represents a view in elevation of a beer cooler made in accordance with my invention, said view being partly broken away to better illustrate the structural details.

Referring by letter to the drawing, A indicates a tube or drum provided with heads B, B′, secured to the ends thereof by bolts $a$, the head B′ being provided with stuffing-boxes $b$, through which the inlet and discharge ends $c$, $c'$, of a coiled pipe D project. The coils of pipe D are centrally disposed within the tube and extend approximately throughout the length thereof, there being a suitable supporting bracket $d$ projecting from the head B on which the adjacent ends of said pipe coils rest. The tube A is supported by legs $e$, $e'$, and is tapped at its opposite ends for the reception of threaded inlet and discharge pipe sections E, E′, which pipe sections are for the purpose of admitting and drawing off any suitable cooling liquid, such as ammonia or brine, from the aforesaid tube, stop cocks $f$ being provided in said pipe sections for controlling the flow of the liquid. The ends $c$, $c'$, of the pipe D are provided with hose-couplings $g$, $g'$, and stop-cocks $h$, $h'$, for controlling the flow of the beer, which enters the inlet end $c$, of said pipe from a hose $i$ leading from a beer supply-tank or fermenting tube, there being a similar hose $j$ connected to the coupling $g'$ of the outlet end of pipe D, which hose carries the beer when cooled, from the cooler to a filter or storage tank. The discharge end of the pipe D is also provided with a thermometer $k$ and observation globe $m$, the former for convenience of determining the temperature of the beer and the latter to permit the operator to observe the condition of the beer while passing through the filter.

By the construction, as described, it will be seen that the beer when being cooled passes through the coils of pipe, which are submerged in the cooling liquid contained within the tube, thereby increasing the cooling efficiency of the device and at the same time permitting a ready and quick means of cleansing the beer-pipe D, by simply uncoupling the beer hose connections $i$, $j$, and substituting therefor similar connections with a water or other cleansing fluid supply and sewer.

In order to clean the tube and exterior of the pipe coils, the cooling liquid is drawn off and the heads B, B′, removed. The head B′ being secured to the ends of said pipe D also carries with it, when removed, the aforesaid pipe, so that it may readily be cleaned exteriorly, and as the tube is then clear of all obstructions its inner walls can also be cleansed of any foreign substance, and thereafter the heads may be adjusted to their respective positions and the apparatus is again ready for use.

I claim:—

1. A beer-cooler comprising a fluid-containing tube, having inlet and outlet pipe-connections and detachable front and rear heads; the combination of a supporting-bracket projecting inward from the rear head, a longitudinal coiled pipe fitted into the tube, and securing means connecting the inlet and discharge ends of the pipe to the front head, the rear ends of the coils of said pipe being supported by the bracket.

2. In a beer-cooler, a coiled-pipe having inlet and discharge ends, a head, means securing the inlet and discharge ends of the pipe to the head, the said ends being arranged to pass through the same, an open-end tube, inlet and discharge openings in the tube, means for detachably securing one of the open ends of the tube to the aforesaid pipe-carrying head, a head secured to the other open end of said tube, and supporting means for the coil of pipe in connection with the last named head.

In testimony that I claim the foregoing I have hereunto set my hand at Sheboygan in the county of Sheboygan and State of Wisconsin in the presence of two witnesses.

FRANZ RUNGE.

Witnesses:
    A. C. PRESCOTT,
    L. ZIMMERMANN.